(12) United States Patent
Ashish Thumparthy et al.

(10) Patent No.: US 12,388,807 B2
(45) Date of Patent: Aug. 12, 2025

(54) METHOD AND SYSTEM FOR SECURING ASSET DATA IN A COMPUTING ENVIRONMENT

(71) Applicant: Siemens Aktiengesellschaft, Munich (DE)

(72) Inventors: Shiva Ashish Thumparthy, Bangalore Karnataka (IN); Thomas Hubauer, Garching bei Munchen (DE); Janaki Joshi, Karnataka (IN); Naveen Kumar, Karnataka (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 102 days.

(21) Appl. No.: 17/800,595

(22) PCT Filed: Feb. 22, 2021

(86) PCT No.: PCT/EP2021/054294
§ 371 (c)(1),
(2) Date: Aug. 18, 2022

(87) PCT Pub. No.: WO2021/165524
PCT Pub. Date: Aug. 26, 2021

(65) Prior Publication Data
US 2023/0344813 A1    Oct. 26, 2023

(30) Foreign Application Priority Data

Feb. 22, 2020 (IN) .............................. 202041007590

(51) Int. Cl.
*H04L 9/40* (2022.01)
*H04L 9/00* (2022.01)
*H04L 67/306* (2022.01)

(52) U.S. Cl.
CPC ................ *H04L 63/08* (2013.01); *H04L 9/50* (2022.05); *H04L 67/306* (2013.01)

(58) Field of Classification Search
CPC ......... H04L 63/08; H04L 9/50; H04L 67/306; G06Q 10/063; G06Q 10/087
See application file for complete search history.

(56) References Cited

U.S. PATENT DOCUMENTS 10,764,752 B1 *  9/2020  Avetisov ............. H04L 63/0823
10,938,817 B2 *  3/2021  Han ..................... H04L 63/0428
(Continued)

FOREIGN PATENT DOCUMENTS

EP             3550464 A1        10/2019

OTHER PUBLICATIONS

Dietz Marietheres et al: "A Distributed Ledger Approach to Digital Twin Secure Data Sharing", Jun. 11, 2019 (Jun. 11, 2019), Advances in Databases and Information Systems; [Lecture Notes in Computer Science; Lect.Notes Computer], Springer International Publishing, Cham, pp. 281-300, XP047512664, ISBN: 978-3-319-10403-4.
(Continued)

*Primary Examiner* — Michael Won
(74) *Attorney, Agent, or Firm* — Schmeiser, Olsen & Watts LLP

(57) ABSTRACT

A method and system for securing asset data in a computing environment includes receiving a request for modifying asset data. Further, the method includes validating the request for modifying the asset data based on pre-stored one or more parameters associated with the one or more assets deployed in the technical installation and the pre-stored one or more parameters associated with the requestor profile using blockchain validation method. The method further includes modifying the pre stored asset data to generate a modified asset data based on the validated request. Further-
(Continued)

more, the method includes generating a digital representation model of the modified asset data using a knowledge graph. Additionally, the method includes outputting the generated digital representation model of the modified asset data on a user interface.

15 Claims, 7 Drawing Sheets

(56) References Cited

U.S. PATENT DOCUMENTS

| | | | | |
|---|---|---|---|---|
| 11,829,494 | B2* | 11/2023 | Schvey | H04L 63/04 |
| 2016/0337264 | A1* | 11/2016 | Murashko | H04L 67/63 |
| 2018/0011903 | A1* | 1/2018 | Abolhassani | G06F 16/243 |
| 2019/0138662 | A1 | 5/2019 | Deutsch et al. | |
| 2019/0317935 | A1 | 10/2019 | Berti et al. | |
| 2020/0067907 | A1* | 2/2020 | Avetisov | H04L 67/133 |
| 2021/0304021 | A1* | 9/2021 | Puri | G06N 5/02 |
| 2022/0405745 | A1* | 12/2022 | Pratz | G06Q 20/308 |
| 2023/0020983 | A1* | 1/2023 | Shannon, III | G06Q 40/04 |
| 2024/0054141 | A1* | 2/2024 | Badr | G06N 3/063 |
| 2024/0070234 | A1* | 2/2024 | Wells | H04L 9/50 |
| 2024/0104460 | A1* | 3/2024 | Mukherjee | H04L 9/50 |

OTHER PUBLICATIONS

PCT International Search Report and Written Opinion of International Searching Authority mailed May 18, 2021 corresponding to PCT International Application No. PCT/EP2021/054294 filed Feb. 22, 2021.

* cited by examiner

METHOD AND SYSTEM FOR SECURING ASSET DATA IN A COMPUTING ENVIRONMENT

CROSS-REFERENCE TO RELATED APPLICATIONS

This application claims priority to PCT Application No. PCT/EP2021/054294, having a filing date of Feb. 22, 2021, which claims priority to IN Application No. 202041007590, having a filing date of Feb. 22, 2020, the entire contents both of which are hereby incorporated by reference.

FIELD OF TECHNOLOGY

The following relates to technical systems and more particularly relates to a method and system for securing asset data in a computing environment.

BACKGROUND

Usually, any technical installations, such as a manufacturing plants or other automation facilities have a wealth of asset data represented as files, databases and real time automation data. However, such asset data from the manufacturing plants and other automation facilities use different data structures, communication protocols, languages and platforms which has led to great complexity in information technology infrastructure of a typical business enterprise. Different business processes within the typical business enterprise may use completely different computer applications, each computer application being developed and optimized for the particular business process, rather than for the enterprise as a whole. For example, a business enterprise may have a particular computer application for designing the technical installation and another computer application for carrying out engineering on the technical installation. A number of companies have recognized and addressed the need for sharing of asset data across these different computer applications in the business enterprise. Thus, enterprise application integration, has emerged as a strategy for addressing asset data integration from disparate data sources.

In current systems, knowledge graphs have been widely used in order to efficiently integrate such asset data from different computer applications, asset data from the manufacturing plants or asset data from the other automation facilities. Knowledge graphs are used to process planning, task scheduling, diagnostics, product design, capability analysis, resource allocation, analyzing production scenarios, and so forth associated with the technical installation. Knowledge graphs are increasingly becoming the industry choice to aggregate data from different sources in a way that facilitates more complex queries and retrieval of facts over typical data lakes and warehouses where asset data is scattered, siloed, and having heterogeneous schemas. Knowledge graphs permit integrating such asset data into a shared joint asset data space.

However, such asset data being input to the knowledge graphs permit any third-party users to access the asset data and modify the asset data. This asset data modification by a third-party user may tamper the asset data used by the knowledge graph and cause false, unverified information to be generated by such knowledge graphs. In order to ensure that the asset data used by the knowledge graphs are tamper proof and authentic, right access control rules and transparency of operations performed are essential. Industrial tools such as Siemens PLM Software store asset data in a graphical form. For example, a bill of material with linked documents is represented as a tree consisting of equipment data along with link to additional documents. It is of utmost interest that this asset data is consistent, and that released versions of designs by such tool are not changed in any way, example by modifying linked additional documents. Conventionally, any operations performed on the asset data are assigned and verified manually, rather than with inbuilt system verification.

In light of above, there is a need for a method and system for securing asset data in a computing environment which efficiently handles the access control on the asset data and provides tamper proof, reliable asset data to computing systems.

SUMMARY

Therefore, an aspect relates to provide a method and system for securing asset data in a cloud computing environment.

The aspect is achieved by a method for securing asset data in a computing environment. The method comprises receiving a request for modifying asset data. The request comprises one or more parameters associated with the one or more assets deployed in a technical installation and one or more parameters associated with a requestor profile. The asset data comprises asset design and maintenance information, asset configuration information, asset physical block information, test data set, asset alarms and the like. In an embodiment, the content of the asset data comprises, among others, engine serial numbers, module serial numbers, material numbers, and document identifiers.

In an embodiment, the asset comprises servers, robots, switches, automation devices, electrical devices, power devices, gas turbines, programmable logic controllers (PLC) s, human machine interfaces (HMIs), input output modules, motors, valves, pumps, actuators, sensors and other industrial equipment(s). The requestor profile is associated with a reputation score indicating one or more privileges associated with the requestor. In an embodiment, a requestor may be a user on a user device triggering the request. The one or more parameters associated with the one or more assets deployed in the technical installation comprises asset identifier, asset part identifier, modification type identifier, a responder identifier, timestamp information and digital endorsement of the one or more approvers. The one or more parameters associated with requestor profile comprises requestor identifier, transaction identifier, requestor privileges, a reputation score, requestor role, and an encryption key.

The method comprises validating the request for modifying the asset data based on pre-stored one or more parameters associated with the one or more assets deployed in the technical installation and the pre-stored one or more parameters associated with the requestor profile using blockchain validation method.

The method comprises modifying the pre stored asset data to generate a modified asset data based on the validated request. The modified asset data comprises modified one or more parameters associated with the asset and modified one or more parameters associated with the requestor profile. The one or more modifications comprises any change in the asset data. For example, addition of any information, deletion of any information, update or change to any parameter of the asset.

The method further comprises generating a digital representation model of the modified asset data using a knowledge graph. The digital representation model of the modified asset data comprises dynamic linking between the one or more parameters associated with the one or more assets deployed in the technical installation and the one or more parameters associated with the requestor profile. In an embodiment, the digital representation model of the modified asset data may be a digital twin of the one or more assets. Specifically, the digital representation model of the modified asset data may be a digital twin knowledge graph. In an exemplary embodiment, the digital representation models are generated using RDF triples that represent this graph. The source for the information is manifold, e.g. existing database systems, documents, or the like. The process of creating these RDF triples is realized using ETL (extract-transform-load) tooling, and potentially (for some data) virtual data integration (also called ontology-based data access). These triples are either added to the graph database, such as database 120, triple by triple, or is stored into e.g. a file (one typical file name suffix would be .TTL), and then loaded into the graph database in a batch operation. Any update to the initial knowledge graph would then be conducted by means of SPARQL queries (typically of types CREATE GRAPH, INSERT, DELETE). SPARQL as a pure query language does not modify data—it can therefore "only" be used to retrieve data from the existing knowledge graph (the original one, or a modified one).

The method further comprises outputting the generated digital representation model of the modified asset data on a user interface.

In a preferred embodiment, in validating the request for modifying the asset data based on pre-stored one or more parameters associated with the one or more assets deployed in the technical installation and the pre-stored one or more parameters associated with the requestor profile using the blockchain validation, the method comprises executing one or more data semantic based rules on the one or more parameters associated with the one or more assets deployed in the technical installation. The data semantic rules comprises both generic (e.g. (1) expressing that a bill of material must always be tree-shaped, i.e. each part may have at most one parent part, or (2) each person must have exactly one age value of datatype integer), or use-case specific (e.g. a regular expression defining a pattern for valid serial numbers). In a preferred embodiment, these rules is expressed using SPARQL queries (e.g. ASK queries looking for (sub-) graphs violating the constraints), or SHACL/SHEx constraints (that define how valid (sub-) graphs must be structured. Further, the method comprises determining the one or more parameters associated with the requestor profile upon executing the one or more data semantic based rules. The one or more parameters associated with the requestor profile is determined by parsing the request. Further, the method comprises determining one or more pre-defined transaction management conditions applicable to the one or more parameters associated with the requestor profile. The one or more predefined transaction management conditions comprises privileges associated with the participants of a transaction, transaction identifier, role of participants, asset values and parameters, required endorsements for the transaction, gamification, reputation score associated with the participants and the like.

Further, the method comprises verifying whether the one or more parameters associated with the requestor profile satisfy with the one or more pre-defined transaction management conditions. Further, the method comprises outputting results of verification of the one or more parameters associated with the requestor profile. The results of verification indicate whether the one or more parameters associated with the requestor profile satisfy with the one or more pre-defined transaction management conditions or not. The verification results comprise a success or failure state. A success state indicates that the one or more parameters associated with the requestor profile satisfy with the one or more pre-defined transaction management conditions. A failure state indicates that the one or more parameters associated with the requestor profile does not satisfy with the one or more pre-defined transaction management conditions. In case if the verification results indicate failure state, then a notification/alert message is displayed on the user interface of the user devices indicating the failure state.

In an aspect of the preferred embodiment, in verifying whether the one or more parameters associated with the requestor profile satisfy with the one or more pre-defined transaction management conditions, the method comprises rejecting the request for modifying the asset data if the verification of the one or more parameters associated with the requestor profile fails to satisfy the one or more pre-defined transaction management conditions.

In another preferred embodiment, in modifying the pre stored asset data to generate a modified asset data based on the validated request, the method comprises determining whether the request is successfully validated based on the results of verification of the one or more parameters associated with the requestor profile. Further, the method comprises identifying part of the pre-stored asset data requested to be modified based on the one or more parameters associated with the one or more assets. In an embodiment, part of the pre-stored asset data may comprise for example, configuration parameters associated with the asset, for which the requestor is allowed to modify. Further, the method comprises determining type of modification to be performed on the identified part of the pre-stored asset data based on pre-stored data table. The type of modification comprises classical CRUD operations on data such as creation of a new attribute value, update of an existing value, and deletion of an existing value. The method further comprises modifying the part of the pre-stored asset data based on the determined type of modification to generate the modified asset data.

In another preferred embodiment, the method comprises obtaining confirmation message associated with modification performed on the pre-stored asset data upon modifying the pre-stored asset data. In an embodiment, the confirmation message is received from a responder to whom the request to modify the asset data was sent by the requestor. Upon modifying the asset data, the confirmation message is obtained by the requestor from the responder. The confirmation message comprises additional parameters associated with the modification performed on the pre-stored asset data. The additional parameters associated with the modification comprises responder identifier, transaction identifier, list of parts associated with the asset which are modified, time stamp information, a digital signature of the responder, and optionally additional evidence. Further, the method comprises validating the confirmation message comprising the additional parameters associated with the modification performed on the pre-stored asset data based on pre-defined conditions. The pre-defined conditions comprise valid transaction identifier, valid responder identifier, modification request identifier, asset identifier, asset part identifier, acceptable evidences, type of medication and the like.

In yet another aspect of the embodiment, in generating the digital representation model of the modified asset data using the knowledge graph, the method comprises generating the digital representation model of the modified asset data using the knowledge graph based on the validation of the confirmation message associated with the modification performed on the pre-stored asset data.

In still another preferred embodiment, in generating the digital representation model of the modified asset data using the knowledge graph, the method comprises determining one or more dynamic linkings between the one or more parameters associated with the modified asset data based on the generated modified asset data. The dynamic linking indicates the relationship between the one or more parameters associated with the modified asset data in the form of one or more nodes linked in a tree form. In an embodiment, the dynamic linking is determined based on standard knowledge graph methods. Further, the method comprises validating the one or more dynamic linking between the one or more parameters associated with the modified asset data based on the pre-stored data table. In an embodiment, the pre-stored data table may be a look up table comprising the detailed structure of one or more parameters associated with the modified asset data with corresponding dynamic links with which those one or more parameters could be linked. Furthermore, the method comprises generating the digital representation model of the modified asset data using the knowledge graph.

In still another embodiment, in outputting the generated digital representation model of the modified asset data on the user interface, the method comprises displaying the generated digital representation model of the modified asset data on the user interface. The generated digital representation model is a knowledge graph.

In still another embodiment, the method comprises storing the generated digital representation model in a database.

The aspect is also achieved by a computing system for securing asset data in a computing environment. The computing system may comprise one or more processors and a memory coupled to the one or more processors. The memory comprises an asset data management module stored in the form of machine-readable instructions and executable by the one or more processors. The asset data management module is configured for performing the method described above.

The aspect is also achieved by a computing environment. The computing environment comprising a computing system, a technical installation comprising one or more assets capable of communicating asset data associated with the one or more assets to the computing system. The computing environment comprises at least one user device communicatively coupled to the computing system and the technical installation via a network.

The aspect is also achieved by a computer-program product (non-transitory computer readable storage medium having instructions, which when executed by a processor, perform actions) having machine-readable instructions stored therein, that when executed by one or more processor(s), cause the one or more processor(s) to perform method steps as described above.

The above-mentioned and other features of embodiments of the invention will now be addressed with reference to the accompanying drawings of embodiments of the present invention. The illustrated embodiments are intended to illustrate, but not limit embodiments of the invention.

BRIEF DESCRIPTION

Some of the embodiments will be described in detail, with reference to the following figures, wherein like designations denote like members, wherein.

DETAILED DESCRIPTION

Figure 1:
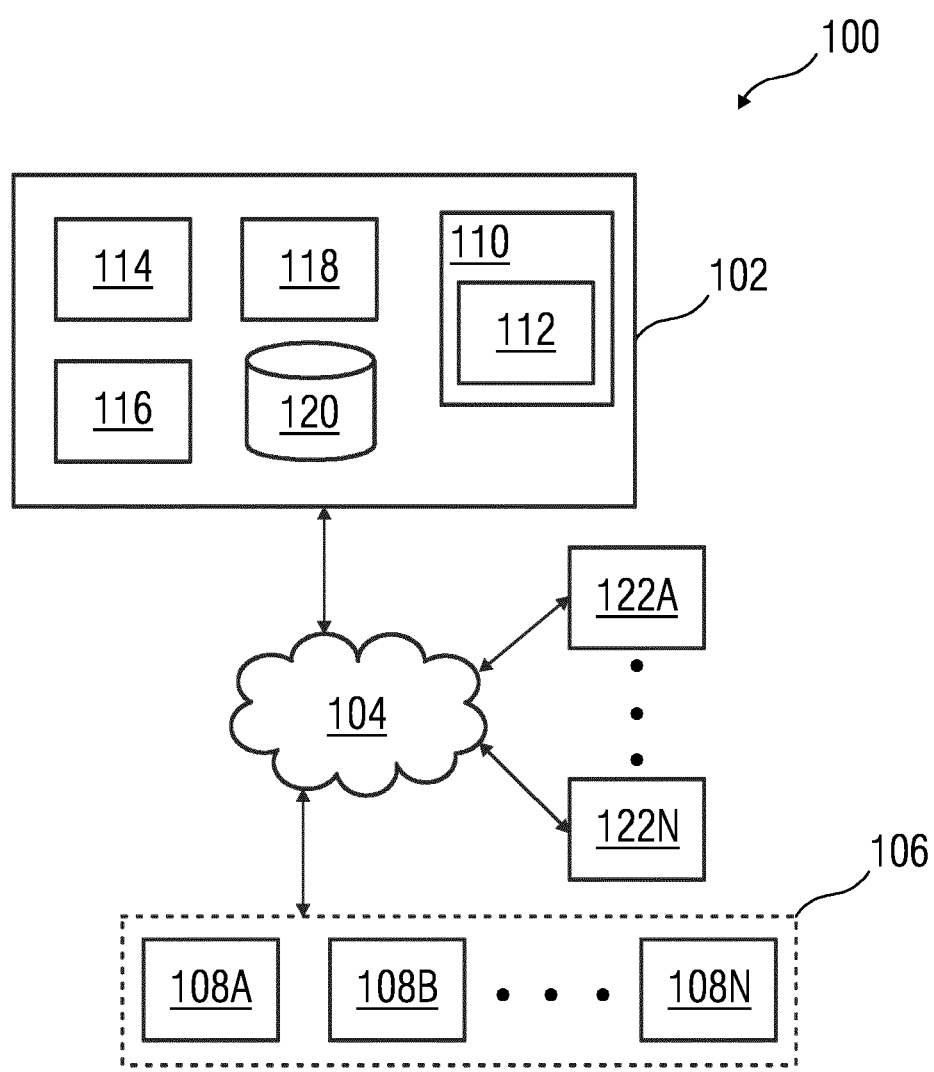
FIG. 1 is a schematic representation of a computing environment capable of securing asset data, according to an embodiment of the present invention.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 is a schematic representation of a computing environment 100 capable of securing asset data, according to an embodiment of the present invention. Particularly, FIG. 1 depicts a computing system 102 which is capable of delivering remotely hosted applications (for example, cloud applications) for managing a technical installation 106 comprising one or more asset(s) 108A-N. As used herein, "computing environment" refers to a processing environment comprising configurable computing physical and logical resources, for example, networks, servers, storage, applications, services, etc., and data distributed over a platform (such as a cloud platform). The computing environment 100 provides on-demand network access to a shared pool of the configurable computing physical and logical resources. In an embodiment, the computing environment 100 may be a cloud computing environment, and the computing system 102 may be a cloud computing system.

The computing system 102 is connected to one or more asset(s) 108A-N in the technical installation 106 via a network 104 (e.g., Internet). The one or more asset(s) 108A-N may include servers, robots, switches, automation devices, programmable logic controllers (PLC)s, turbines, human machine interfaces (HMIs), input output modules, motors, valves, pumps, actuators, sensors, gas turbines, and other industrial equipment(s). In a preferred embodiment, the computing system 102 is a cloud computing system. The computing system 102 may be a public cloud, a private cloud, and/or a hybrid cloud configured to provide dedicated cloud services to its users. Although, FIG. 1 illustrates the computing system 102 connected to one technical installation 106 via the network 104, one skilled in the art can envision that the computing system 102 can be connected to several technical installations 106 located at different locations via the network 104.

Further, the computing system 102 is also connected to user devices 122A-N via the network 104. The user devices 122A-N can access the computing system 102 for securing asset data associated with the asset 108A-N deployed in the technical installation 106. In an embodiment, the user devices 122A-N comprises an engineering system capable of running an industrial automation application. The user devices 122A-N can be a laptop computer, desktop computer, tablet computer, smartphone and the like. The user devices 122A-N can access remote applications (such as enabling authorized users to access the asset data based on requirement) via a web browser.

The computing system 102 comprises a platform 110, an asset data management module 112, a server 114 including hardware resources and an operating system (OS), a network interface 116, a database 120 and an application program interfaces (APIs) 118. The network interface 116 enables communication between the computing system 102, the technical installation 106, and the user device(s) 122A-N. The communication interface (not shown in FIG. 1) may allow the engineers at the one or more user device(s) 122A-N to access asset data stored at the computing system 102 and perform one or more actions on the asset data as same instance. The server 114 may include one or more servers on which the OS is installed. The servers 114 may comprise one or more processors, one or more storage devices, such as, memory units, for storing data and machine-readable instructions for example, applications and application programming interfaces (APIs) 118, and other peripherals required for providing cloud computing functionality. The remote platform 110 is a platform which enables functionalities such as data reception, data processing, data rendering, data communication, etc., using the hardware resources and the OS of the servers 114 and delivers the aforementioned remote services using the application programming interfaces 118 deployed therein. The remote platform 110 may comprise a combination of dedicated hardware and software built on top of the hardware and the OS.

The database 120 is configured for storing information associated with the one or more assets 108A-N in one or more data format. The database 120 is, for example, a graph database such as Amazon Neptune, Ontotext GraphDB, CSI AnzoGraph, or any other database capable of storing and representing knowledge graphs. The database 120 is configured as remote database implemented in the computing environment 100, where computing resources are delivered as a service over the remote platform 110. The database 120, according to another embodiment of the present invention, is a location on a file system directly accessible by the asset data management system 112. In another embodiment, the database 120 may be external data sources each having different schema and different file formats. The database 120 is configured to store asset data, one or more parameters associated with the asset 108A-N, one or more parameters associated with the requestor profile, semantic rule checks, pre-stored data table, pre-stored transaction management conditions, digital representation models, validation results, user privileges, access control rules, and the like. The database 120 also maintains versions of the digital representation models.

Figure 2:
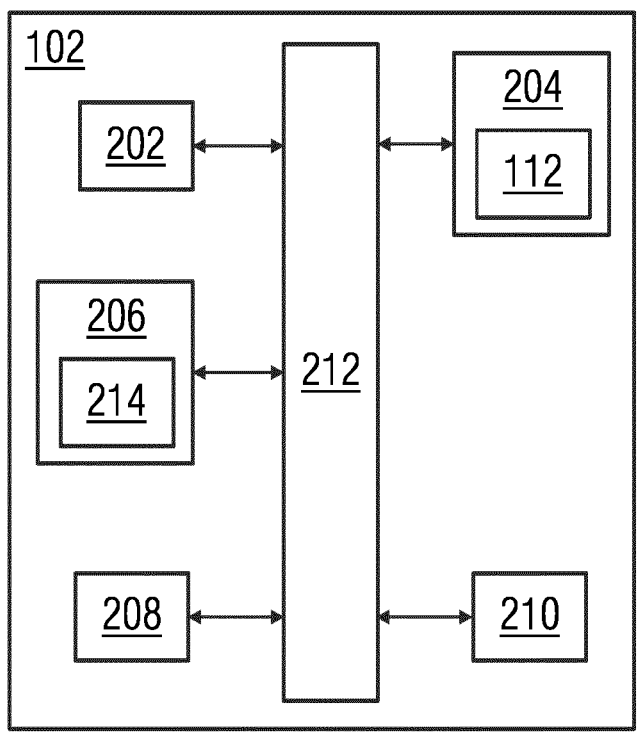
FIG. 2 is a block diagram of computing system, such as those shown in FIG. 1, in which an embodiment of the present invention can be implemented.

FIG. 2 is a block diagram of a computing system 102, such as those shown in FIG. 1, in which an embodiment of the present invention can be implemented. In FIG. 2, the computing system 102 includes a processor(s) 202, an accessible memory 204, a storage unit 206, a communication interface 208, an input/output unit 210, and a bus 212.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes an asset data management module 112 stored in the form of machine-readable instructions on any of the above-mentioned storage media and may be in communication with and executed by the processor(s) 202.

When executed by the processor(s) 202, the asset data management module 112 causes the processor(s) 202 to secure asset data in a computing environment 100. In an embodiment, the asset data management module 112 causes the processor(s) 202 to receive a request for modifying asset data. The request comprises one or more parameters associated with the one or more assets 108A-N deployed in the technical installation 106. and one or more parameters associated with a requestor profile. The asset data comprises asset design and maintenance information, asset configuration information, asset physical block information, test data set, asset alarms and the like. In an embodiment, the content of the asset data comprises, among others, engine serial numbers, module serial numbers, material numbers, and document identifiers.

In an embodiment, the asset comprises servers, robots, switches, automation devices, electrical devices, power devices, gas turbines, programmable logic controllers (PLC)s, human machine interfaces (HMIs), input output modules, motors, valves, pumps, actuators, sensors and other industrial equipment(s). The requestor profile is associated with a reputation score indicating one or more privileges associated with the requestor. In an embodiment, a requestor may be a user on a user device triggering the request. The one or more parameters associated with the one or more assets deployed in the technical installation comprises asset identifier, asset part identifier, modification type identifier, a responder identifier, timestamp information and digital endorsement of the one or more approvers. The one or more parameters associated with requestor profile comprises requestor identifier, transaction identifier, requestor privileges, a reputation score, requestor role, and an encryption key.

Further, the asset data management module 112 causes the processor(s) 202 to validate the request for modifying the asset data based on pre-stored one or more parameters associated with the one or more assets 108A-N deployed in the technical installation 106 and the pre-stored one or more parameters associated with the requestor profile using blockchain validation method.

Further, the asset data management module 112 causes the processor(s) 202 to modify the pre stored asset data to generate a modified asset data based on the validated request. The modified asset data comprises modified one or more parameters associated with the asset 108A-N and modified one or more parameters associated with the requestor profile. The one or more modifications comprises any change in the asset data. For example, addition of any information, deletion of any information, update or change to any parameter of the asset 108A-N. In an exemplary embodiment, modifications are performed within the digital representation as part of the SPARUL queries.

Further, the asset data management module 112 causes the processor(s) 202 to generate a digital representation model of the modified asset data using a knowledge graph. The digital representation model of the modified asset data comprises dynamic linking between the one or more parameters associated with the one or more assets 108A-N deployed in the technical installation 106 and the one or more parameters associated with the requestor profile. In an embodiment, the digital representation model of the modified asset data may be a digital twin of the one or more assets 108A-N. Specifically, the digital representation model of the modified asset data may be a digital twin knowledge graph. In an exemplary embodiment, the digital representation models are generated using the SPARUL data query.

Further, the asset data management module 112 causes the processor(s) 202 to output the generated digital representation model of the modified asset data on a user interface.

In validating the request for modifying the asset data based on pre-stored one or more parameters associated with the one or more assets 108A-N deployed in the technical installation 106 and the pre-stored one or more parameters associated with the requestor profile using the blockchain validation, the asset data management module 112 causes the processor(s) 202 to execute one or more data semantic based rules on the one or more parameters associated with the one or more assets 108A-N deployed in the technical installation 106. The data semantic rules comprises both generic (e.g. (1) expressing that a bill of material must always be tree-shaped, i.e. each part may have at most one parent part, or (2) each person must have exactly one age value of datatype integer), or use-case specific (e.g. a regular expression defining a pattern for valid serial numbers). In a preferred embodiment, these rules are expressed using SPARQL queries (e.g. ASK queries looking for (sub-)graphs violating the constraints), or SHACL/SHEx constraints (that define how valid (sub-)graphs must be structured. Further, the asset data management module 112 causes the processor(s) 202 to determine the one or more parameters associated with the requestor profile upon executing the one or more data semantic based rules. The one or more parameters associated with the requestor profile is determined by parsing the request. Further, the method comprises determining one or more pre-defined transaction management conditions applicable to the one or more parameters associated with the requestor profile. The one or more predefined transaction management conditions comprises privileges associated with the participants of a transaction, transaction identifier, role of participants, asset values and parameters, required endorsements for the transaction, gamification, reputation score associated with the participants and the like.

Further, the asset data management module 112 causes the processor(s) 202 to verify whether the one or more parameters associated with the requestor profile satisfy with the one or more pre-defined transaction management conditions. Further, the asset data management module 112 causes the processor(s) 202 to output results of verification of the one or more parameters associated with the requestor profile. The results of verification indicate whether the one or more parameters associated with the requestor profile satisfy with the one or more pre-defined transaction management conditions or not. The verification results comprise a success or failure state. A success state indicates that the one or more parameters associated with the requestor profile satisfy with the one or more pre-defined transaction management conditions. A failure state indicates that the one or more parameters associated with the requestor profile does not satisfy with the one or more pre-defined transaction management conditions. In case if the verification results indicate failure state, then a notification/alert message is displayed on the user interface of the user devices 122A-N indicating the failure state.

In verifying whether the one or more parameters associated with the requestor profile satisfy with the one or more pre-defined transaction management conditions, the asset data management module 112 causes the processor(s) 202 to reject the request for modifying the asset data if the verification of the one or more parameters associated with the requestor profile fails to satisfy the one or more predefined transaction management conditions.

In modifying the pre stored asset data to generate a modified asset data based on the validated request, the asset data management module 112 causes the processor(s) 202 to determine whether the request is successfully validated based on the results of verification of the one or more parameters associated with the requestor profile. Further, the asset data management module 112 causes the processor(s) 202 to identify part of the pre-stored asset data requested to be modified based on the one or more parameters associated with the one or more assets 108A-N. In an embodiment, part of the pre-stored asset data may comprise for example, configuration parameters associated with the asset 108A-N, for which the requestor is allowed to modify. Further, the asset data management module 112 causes the processor(s) 202 to determine type of modification to be performed on the identified part of the pre-stored asset data based on pre-stored data table. The type of modification comprises classical CRUD operations on data such as creation of a new attribute value, update of an existing value, and deletion of an existing value. The asset data management module 112 causes the processor(s) 202 to modify the part of the pre-stored asset data based on the determined type of modification to generate the modified asset data. The pre-stored data table is specific to type of asset stored and the corresponding asset data available.

Further, the asset data management module 112 causes the processor(s) 202 to obtain confirmation message associated with modification performed on the pre-stored asset data upon modifying the pre-stored asset data. The confirmation message is received from a responder to whom the request to modify the asset data was sent by the requestor. Upon modifying the asset data, the confirmation message is obtained by the requestor from the responder. The confirmation message comprises additional parameters associated with the modification performed on the pre-stored asset data. The additional parameters associated with the modification comprises responder identifier, transaction identifier, list of parts associated with the asset which are modified, time stamp information, a digital signature of the responder, and optionally additional evidence. Further, the asset data management module 112 causes the processor(s) 202 to validate the confirmation message comprising the additional parameters associated with the modification performed on the pre-stored asset data based on pre-defined conditions. The pre-defined conditions comprises valid transaction identifier, valid responder identifier, modification request identifier, asset identifier, asset part identifier, acceptable evidences, type of medication and the like.

In generating the digital representation model of the modified asset data using the knowledge graph, the asset data management module 112 causes the processor(s) 202 to generate the digital representation model of the modified asset data using the knowledge graph based on the validation of the confirmation message associated with the modification performed on the pre-stored asset data.

In generating the digital representation model of the modified asset data using the knowledge graph, the asset data management module 112 causes the processor(s) 202 to determine one or more dynamic linking between the one or more parameters associated with the modified asset data based on the generated modified asset data. The dynamic linking indicates the relationship between the one or more parameters associated with the modified asset data in the form of one or more nodes linked in a tree form. In an embodiment, the dynamic linking is determined based on standard knowledge graph methods. Further, the method comprises validating the one or more dynamic linking between the one or more parameters associated with the modified asset data based on the pre-stored data table. In an embodiment, the pre-stored data table may be a look up table comprising the detailed structure of one or more parameters associated with the modified asset data with corresponding dynamic links with which those one or more parameters could be linked. Furthermore, the asset data management module 112 causes the processor(s) 202 to generate the digital representation model of the modified asset data using the knowledge graph.

In outputting the generated digital representation model of the modified asset data on the user interface, the asset data management module 112 causes the processor(s) 202 to display the generated digital representation model of the modified asset data on the user interface. The generated digital representation model is a knowledge graph.

Also, the asset data management module 112 causes the processor(s) 202 to store the generated digital representation model in a database.

In an exemplary embodiment, knowledge graph technology is used for dynamically mapping the asset data with corresponding asset data extracted from other external data sources. Knowledge graphs provide "schema on read" capabilities. Due to this capability, the computing system 102 efficiently handles asset data extraction and integration in the context of heterogeneous and potentially changing data source (such as data base 120) schemas. Further, Knowledge graphs expose different schemas for the same underlying knowledge graph (which is the digital representation), thereby meeting the needs of different consumer systems. Despite this flexibility, Knowledge Graphs (at least if expressed using the RDF formalism) has formalized and standardized syntax and semantics. This makes the chosen approach largely independent of concrete tools and allows for an easy extension/integration with other systems or digital twins.

The storage unit 206 is configured for storing the asset data associated with one or more asset(s) 108A-N. The storage unit 206 comprises a library of digital representation models associated with the asset data. The storage unit 206 comprises a knowledge base 214 for storing the generated digital representation models. Also, the knowledge base 214 is responsible for updating the versions of the digital representation models as and when they are modified.

The communication interface 208 is configured for establishing communication sessions between the one or more user device 122A-N and the computing system 102. The communication interface 208 allows the one or more engineering applications running on the user devices 122A-N to import/export digital representations into the computing system 102. In an embodiment, the communication interface 208 interacts with the interface at the user devices 122A-N for allowing the engineers to access the digital representations of the asset information based on the user privileges and access control rules and perform one or more actions on the digital representations stored in the computing system 102.

The input-output unit 210 may include input devices a keypad, touch-sensitive display, camera (such as a camera receiving gesture-based inputs), etc. capable of receiving one or more input signals, such as user commands to process asset data. Also, the input-output unit 210 may be a display unit for displaying a graphical user interface which visualizes the asset data and also displays the status information associated with each set of actions performed on the asset data. The set of actions may include data entry, data modification or data display. The bus 212 acts as interconnect between the processor 202, the memory 204, the storage unit 206 and the input-output unit 210.

Those of ordinary skilled in the art will appreciate that the hardware depicted in FIG. 2 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a computing system 102 as is unique to the present disclosure or necessary for an understanding of the present disclosure is depicted and described. The remainder of the construction and operation of the computing system 102 may conform to any of the various current implementation and practices known in the art.

Figure 3:
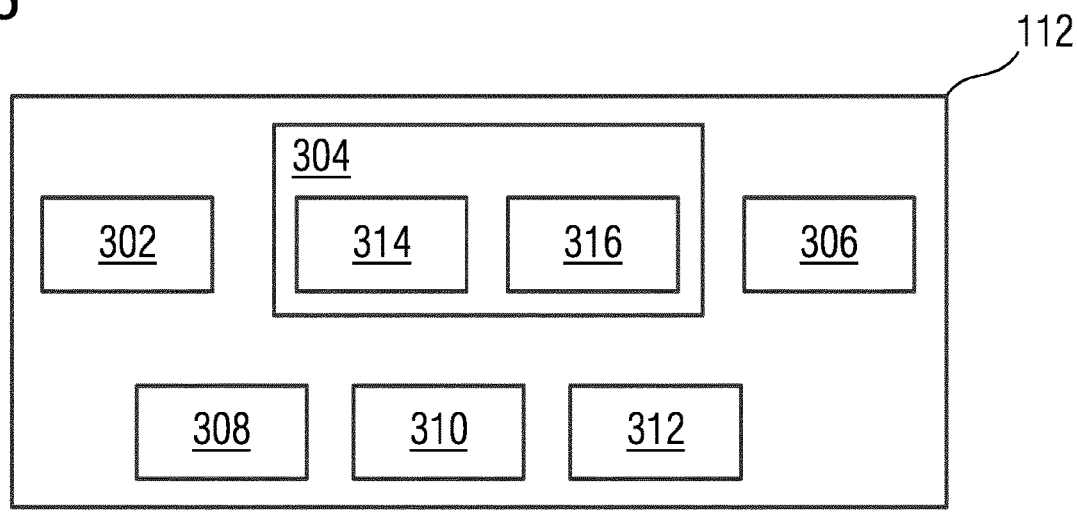
FIG. 3 is a block diagram of an asset data management module, such as those shown in FIG. 1 and FIG. 2, in which an embodiment of the present invention can be implemented.

FIG. 3 is a block diagram of an asset data management module 112, such as those shown in FIG. 1 and FIG. 2, in which an embodiment of the present invention can be implemented. The asset data management module 112 comprises a request handler module 302, a validation module 304, asset data modifier module 306, a digital representation model generation module 308, a database 310, and an output module 312. The validation module 304 comprises a semantic rule checker module 314 and a blockchain network module 316.

The request handler module 302 is configured for receiving a request for modifying asset data. The request comprises one or more parameters associated with the one or more assets 108A-N deployed in the technical installation 106 and the one or more parameters associated with the requestor profile. The requestor profile is associated with a reputation score indicating one or more privileges associated with the requestor. The reputation score is associated with each participant in the computing system 102, which rises with streaks of successful issue and subsequent validation of the requests. Endorsement policies is a function of the reputation a participant has. For example, a supervisor with a high reputation score would need less endorsements to propose a modification than a newly appointed supervisor at the same level of the supervisor hierarchy. This ensures a significant time saving in the resolution of modifications. The reputation scores decide which floor engineer is assigned a modification instruction that is considered high-risk. Optionally, floor engineers may also be required to perform a certain number of modifications (scheduled maintenance or supervisor instructed modifications) defined in a service level agreement with the factory. Meeting or exceeding the minimum number of modifications performed enhances the reputation of the floor engineer, while failure in completing the assigned number of modifications result in a lowering of the reputation score.

The one or more parameters associated with the one or more assets 108A-N deployed in the technical installation 106 comprises asset identifier, asset part identifier, modification type identifier, a responder identifier, timestamp information and digital endorsement of the one or more approvers. The one or more parameters associated with requestor profile comprises requestor identifier, transaction identifier, requestor privileges, a reputation score, requestor role, and an encryption key.

The validation module 304 is configured for validating the request for modifying the asset data based on pre-stored one or more parameters associated with the one or more assets 108A-N deployed in the technical installation 106 and the pre-stored one or more parameters associated with the requestor profile using blockchain validation method. Specifically, the validation module 304 comprises a semantic rule checker module 314 and a blockchain network module 316. The semantic rule checker module 314 is configured for executing one or more data semantic based rules on the one or more parameters associated with the one or more assets 108A-N deployed in the technical installation 106. In an exemplary embodiment, the semantic rule checker module 314 performs rule-based sanity checks on received asset data. The rule based sanity checks determines the semantic correctness of the received asset data. If the asset data is validated across the semantic based rules, then the semantic rule checker module 314 feeds the semantically sound asset data to the blockchain network module 316.

The blockchain network module 316 is configured for determining the one or more parameters associated with the requestor profile upon executing the one or more data semantic based rules. For example, the one or more parameters such as requestor roles and privileges, and requestor reputation score are determined. If the requester is allowed to proceed with the request based on assessing the roles and privileges of the requestor, then the blockchain network module 316 is configured for determining one or more pre-defined transaction management conditions applicable to the one or more parameters associated with the requestor profile. The one or more predefined transaction management conditions comprises, for instance, whether the requestor has required roles to access/modify the asset, whether the transaction is viable given the asset state (e.g. assets might be protected against modification), and others. Further, the blockchain network module 316 is configured for verifying whether the one or more parameters associated with the requestor profile satisfy with the one or more pre-defined transaction management conditions. The verification is performed using for example comparison of relative order in a lattice, or etc, or any other methods known in the art.

Every request received by a requestor is considered as a transaction by the blockchain network module 316. Each transaction is then assigned a transaction ID with a time stamp information by the request handler module 302. However, in order for a transaction to be valid, the transaction must be approved based on the one or more pre-defined transaction management conditions. In an exemplary embodiment, when a requestor initiates a request, considered as a transaction, number of approvals required to process the transaction is determined based on the one or more pre defined transaction management conditions. Based on such determination, such transactions are sent as transaction proposals to those approvers. The approvers receive the transaction, validate the transaction received based on prestored data in the database 120, approve the transaction by endorsing the transaction and share the approved transaction back to the requestor. Hence, a transaction is considered valid if transaction is approved as per the one or more predefined transaction management conditions. This is achieved by leveraging blockchain smart contracts which automatically enforce endorsement policies. The contract may be consider hierarchy of approvers for each kind of transactions. For example, a factory policy may define that floor supervisors, who are lower in the hierarchy, require at least five endorsements from five approvers, with two endorsements necessarily from a approver higher in the hierarchy.

In an embodiment, in addition to supporting existing hierarchies of approvers and requestors, when a requestor rises in the hierarchy based on previous successful transactions, the one or more predefined transaction conditions may be modified to revise the required number of approvals needed if this requestor initiates the transaction. Therefore, a reputation score is associated with each participant in the computing system 102. A higher value of reputation score indicates more number of successful transaction handling. Further, the one or more predefined transaction management policies, such as endorsement policies is a function of the reputation a participant has. For example, a supervisor with a high reputation score require less number of endorsements to propose a modification than a newly appointed supervisor at the same level of the supervisor hierarchy. This ensures a significant time saving in the resolution of modifications. These reputation scores decide which responder is assigned the request with high-risk of carrying out the instructions in the request or causing significant potential for damage in case of errors. Optionally, the responders are required to perform a number of modifications (scheduled maintenance or supervisor instructed modifications) defined in a service level agreement with the factory when once the request is assigned to them. Meeting or exceeding the minimum number of modifications enhances the reputation score of the responder, while failure to do so result in a lowering of the reputation score.

In an exemplary embodiment, for validating the request by the blockchain network module 316, permissible roles and privileges associated with various participants of the computing system 102 are defined. The various participants comprises a requestor who requests modification of the asset data, one or more approvers who approve the requests and one or more responders who actually perform the modifications of the asset data. For example, in case of a factory environment, a factory administrator may act as a blockchain network administrator to register other participants onto a blockchain network. The factory administrators are also responsible for creating the digital assets on ledger corresponding to the physical assets 108A-N in the factory (such as technical installation 106), i.e. the digital twin of the one or more assets 108A-N. In digital representation models (for example knowledge graph ontology), these digital assets are turbines, their respective parts, and permissible modification types to these parts (i.e., which parts added or removed constitute an atomic 'modification' to the turbine). Once the digital assets are created, floor supervisors and floor engineers initiate transactions related to for example modification request/transaction task assignment and modification task completion. These requests or transactions are initiated with appropriate digital signatures from the employee's blockchain wallet (as described below). Therefore, the factory administration initiates transactions to modify asset data, for example to deploy new turbines, add new machine parts, and create new modification types.

Further, a floor supervisor may act as an approver responsible for ensuring that modifications to the current asset data are necessary and valid. Therefore, a floor supervisor issues a transaction that instructs a floor engineer to perform a modification on a turbine. This transaction is only committed to the ledger when other supervisors confirm through endorsements that the modification instruction is required and well-formed. In addition, a supervisor is also responsible for verifying the modification performed by the floor engineer, which is done by reviewing the confirmation message received by the floor engineer. The confirmation message comprises evidence of performing the modification.

Furthermore, floor engineers, may act as responders responsible for performing modifications to asset data, such as turbines based on modification instructions issued to them by their supervisors. Once the operation is completed, the floor engineers intimate the same to the supervisors through the confirmation message.

In an embodiment, the blockchain network module 316 ensures that the blockchain network is permissioned and private. The validity of a transaction is established through votes, or endorsements, from the required participants. Acknowledgment on these valid transactions is achieved either through ordering nodes running traditional consensus algorithms which are Byzantine fault-tolerant (in the Hyperledger Fabric case), or proof-of-stake-based mining (in the Ethereum case). For example, since there is no mining of transactions and all computational hardware costs are borne by a factory up-front, there is no monetary incentivization scheme necessary for mining transactions. This is different from traditional proof-of-work based mining which would require transaction fees and block mining rewards.

The blockchain network module 316 comprises a mobile application which helps in remotely securing the asset data, in addition to the computing system 102. The mobile application may be running on the user devices 122A-N. Such mobile applications when downloaded onto the user devices 122A-N creates a blockchain wallet (private-public key pair) for the user by default. This blockchain wallet enables the users on the user devices 122A-N to post transactions signed with their private key for the blockchain network module 316 to verify and validate with the corresponding public key. If the user is a floor supervisor, the application in communication with the blockchain network module 316 checks against directory to validate user credentials before issuing a wallet ID. This is essential to ensure separation of roles in the computing system 102, as transactions are scoped to the role of the participant. For example, floor supervisors are responsible for delegating tasks, while floor engineers can only share confirmation messages confirming that the proposed modification has been completed.

Further, the blockchain network module 316 is configured for outputting results of verification of the one or more parameters associated with the requestor profile. The results of verification indicate whether the requestor is permitted to conduct the requested action on the knowledge graph.

Further, the blockchain network module 316 is configured for rejecting the request for modifying the asset data if the verification of the one or more parameters associated with the requestor profile fails to satisfy the one or more pre-defined transaction management conditions. For example, a requestor who is unauthorized to send a request for modification triggers a request or transaction, the blockchain network module 316 rejects the request from such requestor with a message 'unauthorized' to the requestor.

Furthermore, the blockchain network module 316 is configured for obtaining confirmation message associated with modification performed on the pre-stored asset data upon modifying the pre-stored asset data. The confirmation message comprises additional parameters associated with the modification performed on the pre-stored asset data. For example, the confirmation message is received from a responder in response to the request forwarded by the computing system 102 to him after receiving all intended approvals on the request. Further, the blockchain network module 316 is configured for validating the confirmation message comprising the additional parameters associated with the modification performed on the pre-stored asset data based on pre-defined conditions. The pre-defined conditions comprises for instance, checking the return codes signifying the success/failure of the operation requested, but can also include checking the number of modified triples against some operation-dependent expectation. Since, each modification made to the asset data is validated, the quality of the data is maintained and data corruption from unauthorized users is avoided. Also, by manning the asset data being ingested to the knowledge graph using a blockchain filter, the blockchain network module 316 ensures that only valid modifications are made to the knowledge graph. A user is restricted to a predefined set of assets that can be instantiated on the knowledge graph thus ensuring that no unauthorized nodes are created on the knowledge graph. Further, the blockchain network module 316 makes it feasible to trace the modifications performed on the asset data as the modifications are recorded on the blockchain for all transactions. Also, details about the participants involved in this transaction are maintained to ensure traceability.

The blockchain network module 316 feeds the validated request and the received asset data to the asset data modifier module 306 for further processing.

The asset data modifier module 306 is configured for modifying the pre stored asset data to generate a modified asset data based on the validated request. For example, the knowledge graph consists of nodes, relations, and attributes. Nodes are created or deleted, relations are created or deleted (maybe also be updated), and attributes are created, updated, and deleted. The one or more modifications may comprises create, delete, add, update either nodes, relations and attributes of the knowledge graphs. The asset data modifier module 306 is configured for determining whether the request is successfully validated based on results of verification of the one or more parameters associated with the requestor profile. Further, the asset data modifier module 306 is configured for identifying part of the pre-stored asset data requested to be modified based on the one or more parameters associated with the one or more assets 108A-N. For example, if the asset data is for an entire factory, then the part of the pre-stored asset data requested to be modified may be a turbine configuration data or a new turbine details or the like which are to be modified. The parameters determining such part of the asset data requested to be modified may be maintenance data of the factory, health data of the factory or the like.

Further, the asset data modifier module 306 is configured for determining type of modification to be performed on the identified part of the pre-stored asset data based on pre-stored data table. The one or more types of modification comprises node modification, attribute modification or relation modification. The pre-stored data table is a lookup table. For example, such look up table comprises mapped asset data for each of the one or more assets 108A-N. For example, an asset A has asset data such as asset ID, asset type, asset configuration information, asset communication information, asset faults, asset current status and the like. Also, the asset A has type of modification and user identifiers of participants who can perform modifications to such asset data. Also, the asset A may have list of user privileges assigned to it.

Further, the asset data modifier module 306 is configured for modifying the part of the pre-stored asset data based on the determined type of modification to generate the modified asset data. The modified asset data comprises modified one or more parameters associated with the asset and modified one or more parameters associated with the requestor profile. The one or more modifications comprises any change in the asset data. For example, addition of any information, deletion of any information, update or change to any parameter of the asset.

In an exemplary embodiment, once the validation of the request is complete, the asset data modifier module 306 translates the valid transactions or requests into RDF triples and ingest the asset data to the existing asset data stored in the form of a knowledge graph. The ingestion can be achieved using for example REST APIs.

Figure 5:
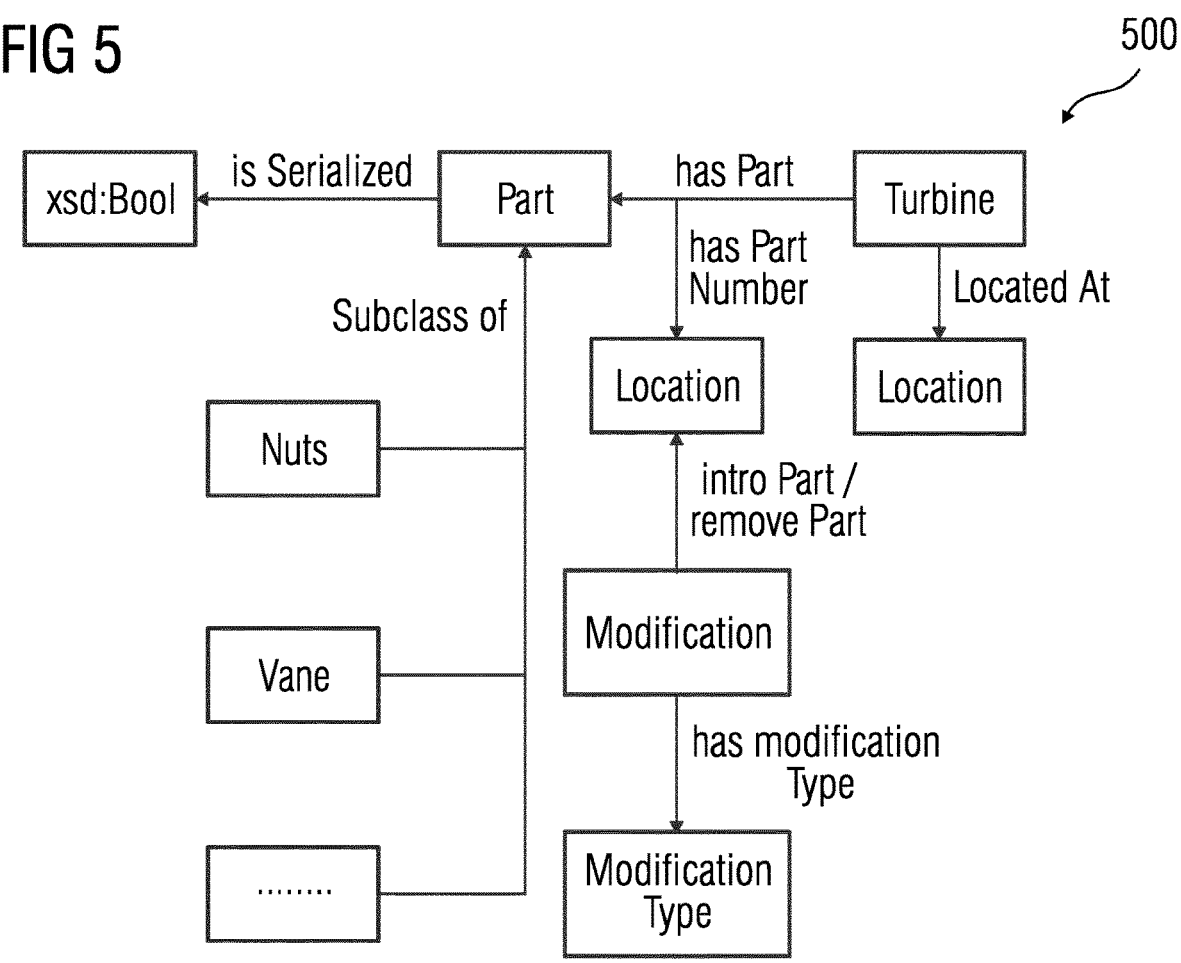
FIG. 5 is a schematic representation of an exemplary digital representation model, according to an embodiment of the present invention.

The digital representation model generation module 308 is configured for generating a digital representation model of the modified asset data using a knowledge graph. The digital representation model of the modified asset data comprises dynamic linking between the one or more parameters associated with the one or more assets 108A-N deployed in the technical installation 106 and the one or more parameters associated with the requestor profile. FIG. 5 depicts an exemplary digital representation model.

The digital representation model generation module 308 is configured for determining one or more dynamic linking between the one or more parameters associated with the modified asset data based on the generated modified asset data. Further, the digital representation model generation module 308 is configured for validating the one or more dynamic linking between the one or more parameters associated with the modified asset data based on the pre-stored data table. Also, the digital representation model generation module 308 is configured for generating the digital representation model of the modified asset data using the knowledge graph.

In an embodiment, the digital representation model generation module 308 is configured for generating the digital representation model of the modified asset data using the knowledge graph based on the validation of the confirmation message associated with the modification performed on the pre-stored asset data. The generation of digital representation model using knowledge graphs may be achieved via any known knowledge graph mechanism. The asset data in the knowledge graph follows specific ontology which allows the end-user to create only data which strictly adheres to the ontology structure and rules. The data can be ingested from several sources into the knowledge graph keeping in line with the structure and rules of the ontology. This ensures data consistency in knowledge graphs.

The database 310 is configured to store the generated digital representation model.

The output module 312 is configured for outputting the generated digital representation model of the modified asset data on the user interface. In a preferred embodiment, the output module 312 is configured for displaying the generated digital representation model of the modified asset data on the user interface using the W3C stack. This stack provides standard semantics for operators, and dedicated components (inference engines) which may be used to add additional information associated with the asset 108A-N. For example, using inference, additional, specific information (e.g. type labels) may be added on nodes based on user-defined rules. This helps domain experts get a better understanding of the asset data outputted on the user devices 122A-N, without having them to specify this data manually on each information item. The generated digital representation model is a knowledge graph. The output module 312 provides an user interface (UI) for displaying the generated digital representation model.

Figure 4:
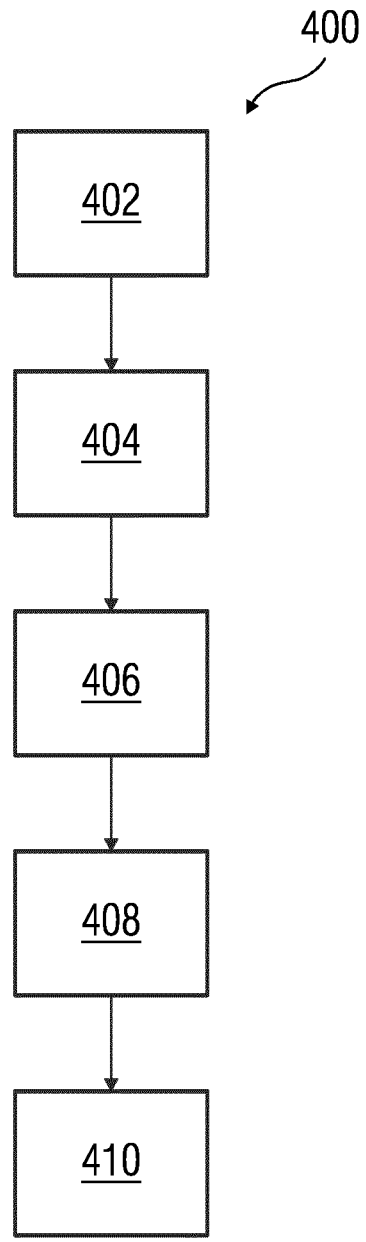
FIG. 4 is a process flowchart illustrating an exemplary method of securing asset data in a computing environment, according to an embodiment of the present invention.

FIG. 4 is a process flowchart illustrating an exemplary method 400 of securing asset data in a computing environment, according to an embodiment of the present invention. At step 402, a request for modifying asset data is received. The request comprises one or more parameters associated with the one or more assets 108A-N deployed in the technical installation 106 and one or more parameters associated with a requestor profile. The requestor profile is associated with a reputation score indicating one or more privileges associated with the requestor. The one or more parameters associated with the one or more assets (108A-N) deployed in the technical installation (106) comprises asset identifier, asset part identifier, modification type identifier, a responder identifier, timestamp information and digital endorsement of the one or more approvers. The one or more parameters associated with requestor profile comprises requestor identifier, transaction identifier, requestor privileges, a reputation score, requestor role, and an encryption key.

At step 404, the request for modifying the asset data is validated based on pre-stored one or more parameters associated with the one or more assets 108A-N deployed in the technical installation 106 and the pre-stored one or more parameters associated with the requestor profile using blockchain validation method.

At step 406, the pre stored asset data is modified to generate a modified asset data based on the validated request. At step 408, a digital representation model of the modified asset data is generated using a knowledge graph. The digital representation model of the modified asset data comprises dynamic linking between the one or more parameters associated with the one or more assets 108A-N deployed in the technical installation 106 and the one or more parameters associated with the requestor profile. At step 410, the generated digital representation model of the modified asset data is outputted on a user interface.

FIG. 5 is a schematic representation of an exemplary digital representation model, according to an embodiment of the present invention. In FIG. 5, a class level ontology for asset such as turbines and the respective parts of the asset 108A-N along with their locations is depicted. The ontology is a digital representation model. The ontology keeps track of modification made for adding or removal of any parts associated with the asset, such as turbine. The part is a class which have several sub-classes such as nuts, vane, and the like. Every individual part has a specific part number which is the unique identity for part with a Boolean property of it being serialized or not. Thus, validating every modification at the servicing facility using the blockchain validation technique keeps track of every modification without the possibility of data in the knowledge graph getting corrupted. The asset data in the digital representation model such as knowledge graph helps to keep track of parts being used and replaced with a proper pipeline to validate the data at the technical installation 106 level.

Figure 6:
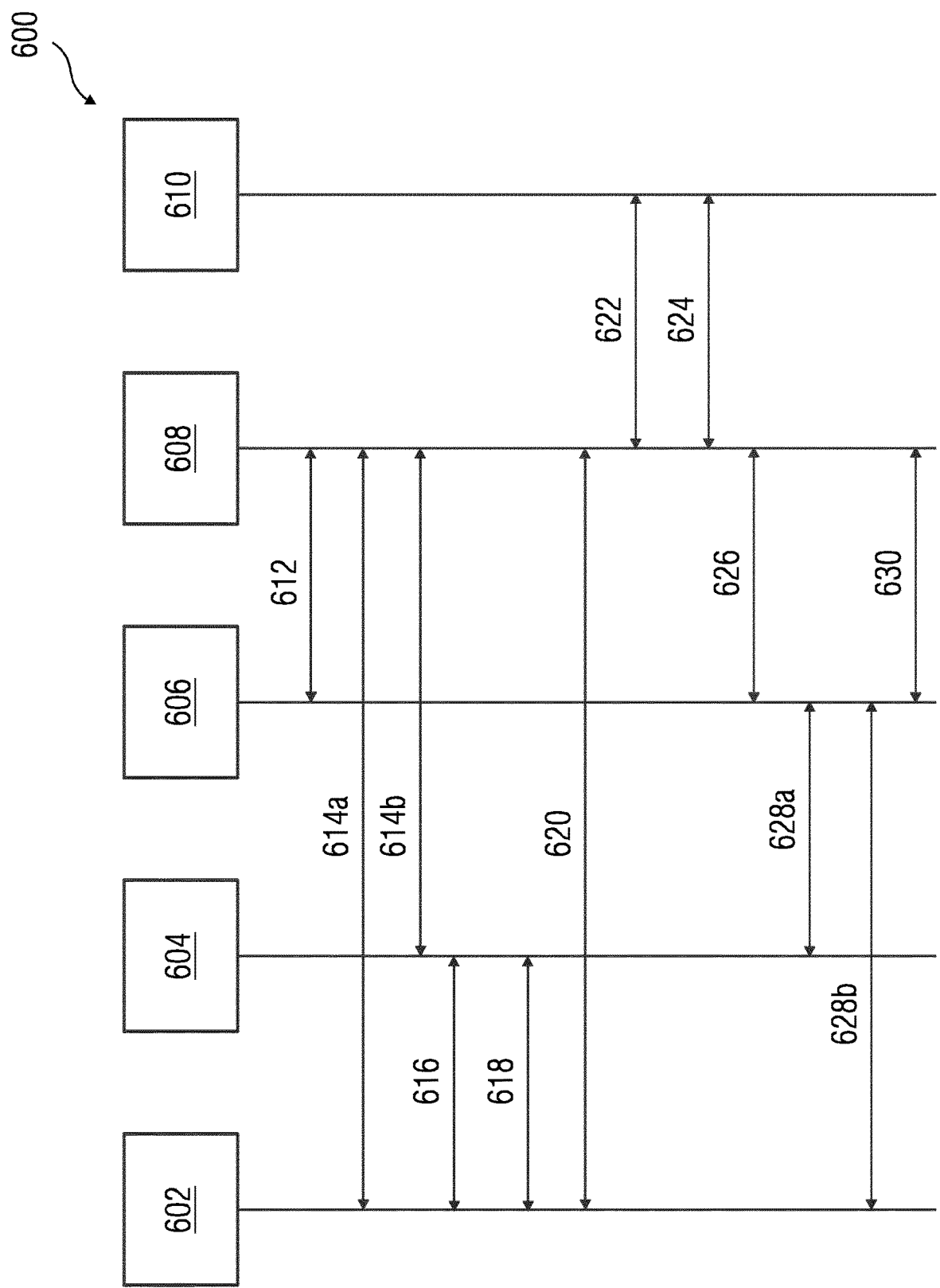
FIG. 6 is a flow diagram illustrating an exemplary method for securing asset data in a computing environment, according to an embodiment of the present invention.

FIG. 6 is a flow diagram illustrating an exemplary method 600 for securing asset data in a computing environment 100, according to an embodiment of the present invention. In FIG. 6, a supervisor 1 device 602 and supervisor 2 device 604 act as approvers of a request or a transaction, requestor device 606 is the one who initiates a request or the transaction, a responder device 610 is a person who acts on the request or transaction and 608 may be a computing system, such as computing system 102. In operation, at step 612, a requestor device 606 initiates a request or transaction to modify asset data, for example, in this case to modify a part of turbine. This request is first verified by an administrator based on the requestor profile. Once such request is approved by the administrator (although not shown), at step 614a and 614b, the request is broadcasted by the computing system 602 as a modification instruction endorsement request to one or more supervisor devices 602 and 694, authorized to endorse the request. For example, in this case, the supervisor 1 and supervisor 2 receives the modification instruction endorsement request. For example, supervisor device 602 endorses the request and then at step 616, sends the endorsed request to supervisor device 604 for his endorsement. Later, at step 618, the supervisor device 604 responds to supervisor device 602 with his endorsement on the request. When once both the supervisor devices 602 and 604 have endorsed the request, at step 620, any one of the supervisor device 602 or 604 generates a modification instruction transaction message and shares the modification instruction transaction message back to the computing system 608 via the requestor device 606. For example, the modification instruction transaction message is broadcasted by a floor supervisor to instruct a floor engineer to make a specific modification to a specific set of parts in a turbine. It is issued upon receiving votes of approval from other floor supervisors in the form of endorsements. Once the necessary endorsements are collected, the transaction is posted with a digital signature of the issuing supervisor. The transaction payload comprises:

{Txn_ID, Supervisor_ID, Engineer_ID, Modification_ID, Part_ID[ ], Turbine_ID, Timestamp, Sign}

Where, TXD ID is the transaction identifier, supervisor ID is the supervisor identifier, engineer ID is the floor engineer or responder identifier, modification ID is type of modification identifier, part ID is related to unique identifier of specific part of asset, turbine ID is the asset identifier, timestamp information, and a digital signature.

The computing system 608 upon receiving the modification instruction transaction message, at step 622, generates a modification instruction event message and transmit this message to responder device 610. The responder device 610 upon performing the instructions mentioned in the modification instruction event message, at step 624, generates the modification completion or confirmation message and transmits the modification completion or confirmation message to the computing system 608. For example, the modification completion message is broadcasted by the floor engineer. Upon being assigned a modification instruction message in the previous transaction, the engineer performs the modification to the turbine. The transaction contains the modification applied to the turbine, with a complete list of parts modified, timestamp, a digital signature, and optionally additional evidence. The transaction payload comprises:

{Txn_ID, Engineer_ID, Modification_ID, Part_ID[ ], Turbine_ID, Evidence_hash, Timestamp, Sign}

Where, TXD ID is the transaction identifier, engineer ID is the floor engineer or responder identifier, modification ID is type of modification identifier, part ID is related to unique identifier of specific part of asset, turbine ID is the asset identifier, timestamp information, and evidence hash is the information on evidence document.

Upon receiving the confirmation message, at step 626, the computing system 608 requests the requestor device 606, and the supervisor devices 602 and 604 to verify the confirmation message. The supervisor devices 602 and 604 reviews the confirmation message and at step 628a and 628b, sends the verified message to the requestor device 606. The requestor device 606 also verifies such confirmation message and finally at step 630 sends a transaction or request complete message to the computing system 608. For example, upon reviewing evidence submitted by the floor engineer, the floor supervisor issues this transaction or request complete message to change the status of the instruction from open to closed. This can be issued by one or more supervisors to validate the completion of the task, gaining rewards for quick resolution of issues or validating evidence submitted by floor engineers. The transaction payload comprises: {Txn_ID, Supervisor_ID, Engineer_ID, Modification_Instruction_Txn_ID, Timestamp, Sign}

Where, TXD ID is the transaction identifier, supervisor ID is the supervisor identifier, engineer ID is the floor engineer or responder identifier, modification instruction taxation ID is type of modification identifier, timestamp information and a digital signature.

Hence, using blockchain based validation method, it is easy to trace who raised a modification request, who approved the modification request, who executed the modification and who verified the modification. Hence, traceability of entire workflow is ensured.

Figure 7:
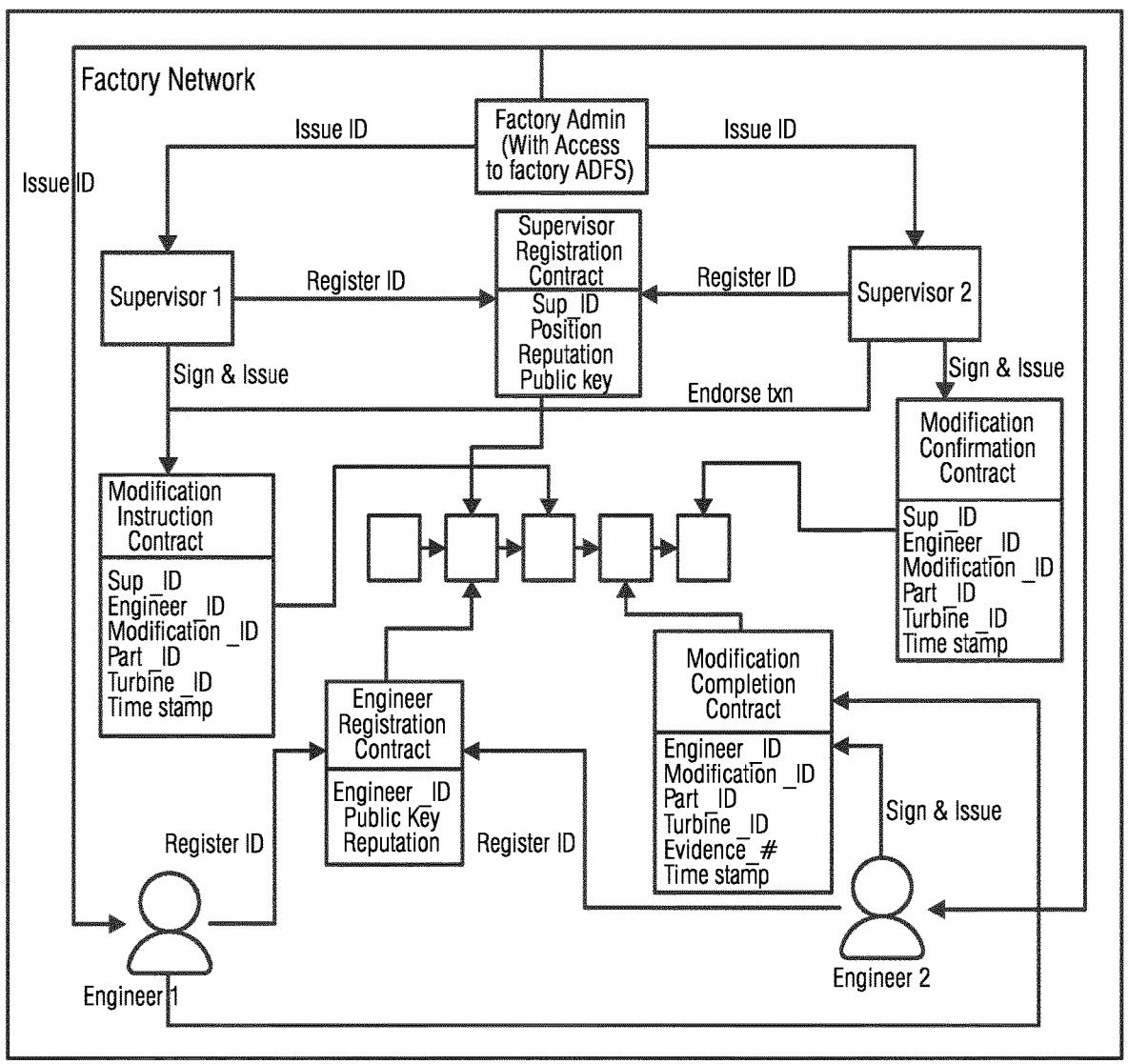
FIG. 7 is a schematic representation of an exemplary workflow of securing asset data in a computing environment, according to an embodiment of the present invention.

FIG. 7 is a schematic representation of an exemplary workflow of securing asset data in a computing environment, according to an embodiment of the present invention. In FIG. 7, different users of the system and their roles are described. More specifically, FIG. 7 highlights the different "participants" in the computing system, such as computing system 102 and the different "transactions" or requests they are authorized to perform. In a digital twin use case, different participants involved in a request are:

a. Factory administrator—responsible for maintaining the assets in the computer system 102 (ie., for example when an asset reaches its end of life and is removed, or a new asset is installed) and for creating other participants and managing their privileges.

b. Supervisor—responsible for approving modification requests, endorsing modification approvals by peer supervisors and verifying completed modifications c. Service/field engineer—responsible for raising a modification request and executing an approved modification.

The different contracts in the diagram represent the above-mentioned transactions and their message body.

Embodiments of the present invention can take a form of a computer program product comprising program modules accessible from computer-usable or computer-readable medium storing program code for use by or in connection with one or more computers, processors, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology can be centralized or distributed (or a combination thereof) as known to those skilled in the art.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for securing industrial asset data in a computing environment, the method comprising:
   receiving, by a processor of a computing system, a request for modifying asset data, wherein the request comprises one or more parameters associated with the one or more assets deployed in a technical installation and one or more parameters associated with a requestor profile, the one or more assets deployed in the technical environment being connected to the computing system via a network;
   validating, by the processor, the request for modifying the asset data based on both: i) pre-stored one or more parameters associated with the one or more assets deployed in the technical installation, and ii) the pre-stored one or more parameters associated with the requestor profile, using a blockchain validation method;
   modifying, by the processor, the pre stored asset data to generate a modified asset data based on the validated request;
   generating, by the processor, a digital representation model of the modified asset data using a knowledge graph, wherein the digital representation model of the modified asset data comprises dynamic linking between the one or more parameters associated with the one or more assets deployed in the technical installation and the one or more parameters associated with the requestor profile; and
   outputting, by the processor, the generated digital representation model of the modified asset data on a user interface.

2. The method as claimed in claim 1, wherein the requestor profile is associated with a reputation score indicating one or more privileges associated with the requestor.

3. The method as claimed in claim 1, wherein the one or more parameters associated with the one or more assets deployed in the technical installation comprises asset identifier, asset part identifier, modification type identifier, a responder identifier, timestamp information and digital endorsement of the one or more approvers.

4. The method as claimed in claim 1, wherein the one or more parameters associated with requestor profile comprises requestor identifier, transaction identifier, requestor privileges, a reputation score, requestor role, and an encryption key.

5. The method as claimed in claim 1, wherein validating the request for modifying the asset data based on pre-stored one or more parameters associated with the one or more assets deployed in the technical installation and the pre-stored one or more parameters associated with the requestor profile using the blockchain validation method comprises:
   executing one or more data semantic based rules on the one or more parameters associated with the one or more assets deployed in the technical installation;
   determining the one or more parameters associated with the requestor profile upon executing the one or more data semantic based rules;
   determining one or more pre-defined transaction management conditions applicable to the one or more parameters associated with the requestor profile;
   verifying whether the one or more parameters associated with the requestor profile satisfy with the one or more pre-defined transaction management conditions; and
   outputting results of verification of the one or more parameters associated with the requestor profile.

6. The method as claimed in claim 3, wherein verifying whether the one or more parameters associated with the requestor profile satisfy with the one or more pre-defined transaction management conditions comprises:
   rejecting the request for modifying the asset data if the verification of the one or more parameters associated with the requestor profile fails to satisfy the one or more predefined transaction management conditions.

7. The method as claimed in claim 1, wherein modifying the pre stored asset data to generate a modified asset data based on the validated request comprises:
   determining whether the request is successfully validated based on results of verification of the one or more parameters associated with the requestor profile;
   identifying part of the pre-stored asset data requested to be modified based on the one or more parameters associated with the one or more assets;
   determining type of modification to be performed on the identified part of the pre-stored asset data based on pre-stored data table; and
   modifying the part of the pre-stored asset data based on the determined type of modification to generate the modified asset data.

8. The method as claimed in claim 1, further comprising:
   obtaining confirmation message associated with modification performed on the pre-stored asset data upon modifying the pre-stored asset data, wherein the confirmation message comprises additional parameters associated with the modification performed on the pre-stored asset data; and validating the confirmation message comprising the additional parameters associated with the modification performed on the pre-stored asset data based on pre-defined conditions.

9. The method as claimed in claim 1, wherein generating the digital representation model of the modified asset data using the knowledge graph comprises:
generating the digital representation model of the modified asset data using the knowledge graph based on the validation of the confirmation message associated with the modification performed on the pre-stored asset data.

10. The method as claimed in claim 1, wherein generating the digital representation model of the modified asset data using the knowledge graph comprises:
determining one or more dynamic linking between the one or more parameters associated with the modified asset data based on the generated modified asset data;
validating the one or more dynamic linking between the one or more parameters associated with the modified asset data based on the pre-stored data table; and
generating the digital representation model of the modified asset data using the knowledge graph.

11. The method as claimed in claim 1, wherein outputting the generated digital representation model of the modified asset data on the user interface comprises:
displaying the generated digital representation model of the modified asset data on the user interface, wherein the generated digital representation model is a knowledge graph.

12. The method as claimed in claim 1, further comprising:
storing the generated digital representation model in a database.

13. A computing system comprising:
one or more processor(s); and
a memory coupled to the one or more processor(s), wherein the memory comprises an asset data management module stored in the form of machine-readable instructions executable by the one or more processor(s), wherein the asset data management module is capable of performing the method according to claim 1.

14. A computing environment comprising:
the computing system according to claim 13;
a technical installation comprising one or more assets capable of communicating asset data to the computing system; and
at least one user device communicatively coupled to the computing system and the technical installation via the network.

15. A computer program product, comprising a computer readable hardware storage device having computer readable program code stored therein, said program code executable by a processor of a computer system to implement a method according to claim 1.

* * * * *